No. 761,325. PATENTED MAY 31, 1904.
J. J. & A. B. SCHIER.
PACKING GASKET.
APPLICATION FILED AUG. 10, 1903.
NO MODEL.
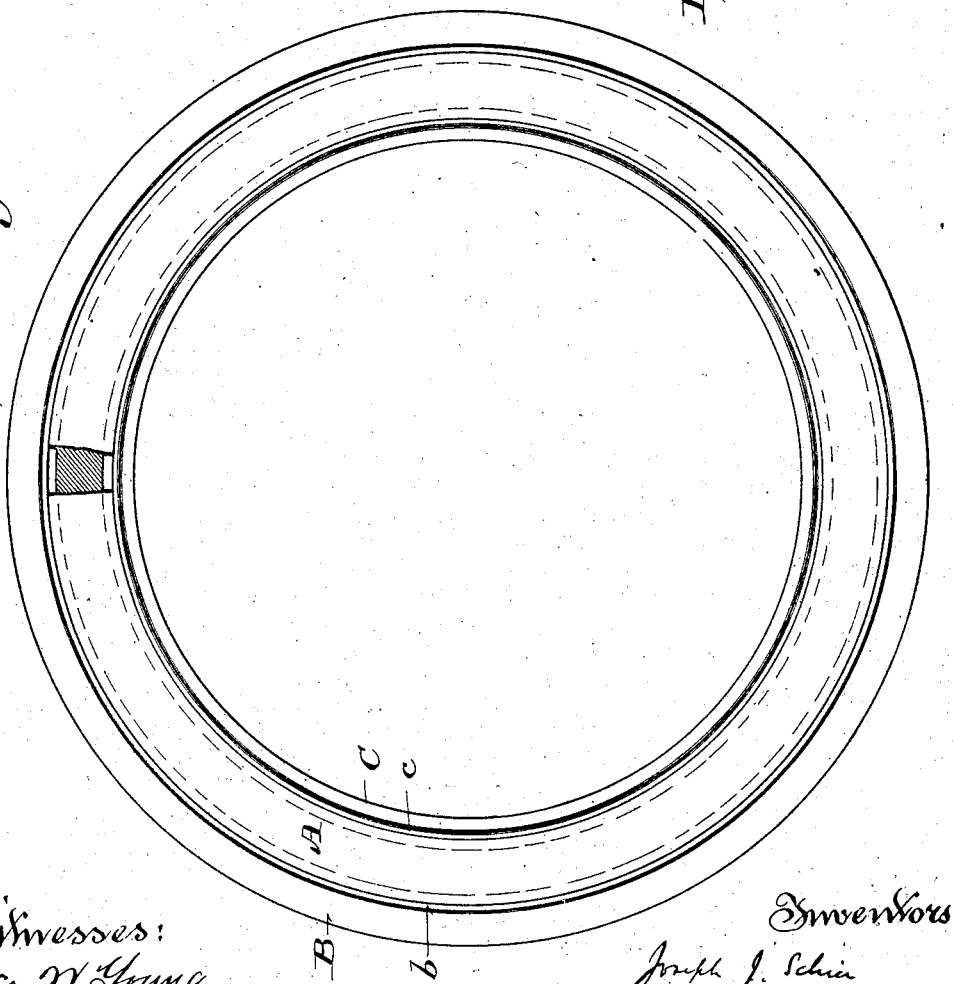

No. 761,325. Patented May 31, 1904.

UNITED STATES PATENT OFFICE.

JOSEPH J. SCHIER AND ADOLPH B. SCHIER, OF MILWAUKEE, WISCONSIN.

PACKING-GASKET.

SPECIFICATION forming part of Letters Patent No. 761,325, dated May 31, 1904.

Application filed August 10, 1903. Serial No. 168,850. (No model.)

*To all whom it may concern:*

Be it known that we, JOSEPH J. SCHIER and ADOLPH B. SCHIER, both citizens of the United States, and residents of Milwaukee, in the county of Milwaukee and State of Wisconsin, have invented certain new and useful Improvements in Packing-Gaskets; and we do hereby declare that the following is a full, clear, and exact description thereof.

Our invention has for its object to provide simple, economical, and durable all-metal packing-gaskets of the species in which concentric rings of varying resistance are combined, a further object of the invention being to prevent spread of the rings of least resistance under pressure.

Hence said invention consists in packing-gaskets similar to what is hereinafter particularly set forth, with reference to the accompanying drawings, and subsequently claimed.

Figure 1 of the drawings represents a plan view of one form of a packing-gasket in accordance with our invention, partly broken away; Fig. 2, a transverse section of a portion of the same; and Fig. 3 a transverse section of a portion of another form of our packing-gasket.

Referring by letter to Figs. 1 and 2 of the drawings, A indicates a compressible ring of soft metal or metallic composition concentric with harder rings B C, to which it is connected intermediate of the same, these harder rings being preferably copper. As a matter of detail the rings of varying resistance are shown in tongue-and-groove connection, the ring A of least resistance being pressed tight on those of greater resistance to maintain its union therewith, and said rings of greater resistance are provided on opposite sides with annular heads $b$ $c$ in opposition to the edges of said ring of least resistance.

As shown in Fig. 3, a preferably copper ring D, provided on opposite sides with annular beads $d$, is arranged between two soft rings A in tongue-and-groove connection therewith, each of these soft rings being in like connection with one or the other of the hard rings B C aforesaid. Hence it is within the scope of our invention to provide all-metal packing-gaskets that separately consist of an indefinite number of united concentric rings alternately of different resistance, but which has each ring of least resistance held between rings of greater resistance, this being an important feature of said invention.

To stiffen the rings B C in any form of the gasket, we may provide opposite sides of the same with annular beads other than the ones $b$ $c$ aforesaid, and said gasket being set in a joint and subjected to pressure the joint is made tight without spreading of the gasket ring or rings of least resistance, that portion of the gasket-ring D outward from its union with a ring of least resistance being sufficiently wide to serve as a guard to keep said union inside the bolt-circle in said joint, this being another important feature of our invention, because it is impossible for the gasket to become displaced or damaged in setting up a joint, especially when a piping is at an angle to a vertical position. Hence tight packing of the joint is insured.

Having thus described our invention, what we claim as new, and desire to secure by Letters Patent, is—

1. A packing-gasket comprising concentric rings of soft metal or metallic composition and harder metal rings alternately disposed and united, the outermost ring being of the harder metal and of a width sufficient to serve as a guard by which its union with the adjacent softer ring is kept inside the bolt-circle in a joint for which the gasket constitutes a packing.

2. A packing-gasket comprising a compressible ring of soft metal or metallic composition, and two harder metal rings in union with the ring aforesaid one inside and the other outside the same, the outer harder metal ring being of a width sufficient to serve as a guard by which its union with the adjacent softer ring is kept inside the bolt-circle of a joint for which the gasket constitutes a packing.

In testimony that we claim the foregoing we have hereunto set our hands, at Milwaukee, in the county of Milwaukee and State of Wisconsin, in the presence of two witnesses.

JOSEPH J. SCHIER.
ADOLPH B. SCHIER.

Witnesses:
N. E. OLIPHANT,
E. W. HELLER.